United States Patent
Ju et al.

(10) Patent No.: US 7,389,114 B2
(45) Date of Patent: Jun. 17, 2008

(54) ESTIMATING THE LOCATION OF INEXPENSIVE WIRELESS TERMINALS BY USING SIGNAL STRENGTH MEASUREMENTS

(75) Inventors: Wen-Hua Ju, Monmouth Junction, NJ (US); Anjur Sundaresan Krishnakumar, Rocky Hill, NJ (US); P Krishnan, North Plainfield, NJ (US); James M Landwehr, Summit, NJ (US); Colin L Mallows, Flemington, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 435 days.

(21) Appl. No.: 10/776,058

(22) Filed: Feb. 11, 2004

(65) Prior Publication Data

US 2005/0176442 A1     Aug. 11, 2005

(51) Int. Cl.
*H04Q 7/20* (2006.01)

(52) U.S. Cl. .............. 455/456.1; 455/456.5; 455/67.11; 342/458; 342/464

(58) Field of Classification Search .............. 455/456.1, 455/456.5, 67.11, 446; 342/463, 453, 465, 342/457, 456, 464, 458
See application file for complete search history.

(56) References Cited

U.S. PATENT DOCUMENTS

| | | | |
|---|---|---|---|
| 6,119,009 A * | 9/2000 | Baranger et al. | 455/446 |
| 6,125,279 A * | 9/2000 | Hyziak et al. | 455/445 |
| 6,393,294 B1 | 5/2002 | Perez-Breva et al. | |
| 6,664,925 B1 | 12/2003 | Moore et al. | |
| 6,674,403 B2 * | 1/2004 | Gray et al. | 342/463 |
| 6,799,047 B1 * | 9/2004 | Bahl et al. | 455/456.1 |
| 6,850,946 B1 * | 2/2005 | Rappaport et al. | 707/101 |
| 7,035,647 B2 * | 4/2006 | de Verteuil | 455/456.1 |
| 2004/0038677 A1 * | 2/2004 | Avery | 455/422.1 |
| 2004/0152470 A1 * | 8/2004 | Spain | 455/456.1 |
| 2004/0180671 A1 * | 9/2004 | Spain, Jr. | 455/456.1 |
| 2005/0036441 A1 * | 2/2005 | Laroia et al. | 370/203 |
| 2005/0124354 A1 * | 6/2005 | Durgin | 455/456.1 |
| 2005/0267677 A1 * | 12/2005 | Poykko et al. | 701/207 |
| 2006/0112272 A1 * | 5/2006 | Morioka et al. | 713/171 |

OTHER PUBLICATIONS

Paramvir Bahl et al., "Radar: An In-Building RF-based User Location and Tracking System," Proceedings of IEEE Infocom 2000, Tel Aviv, Israel, Mar. 2000.
Paramvir Bahl et al., "Enhancements to the Radar User Location and Tracking System," Microsoft Research Technical Report, Redmond, WA, Feb. 2000.

(Continued)

*Primary Examiner*—William Trost
*Assistant Examiner*—Julio Perez
(74) *Attorney, Agent, or Firm*—Muncy, Geissler, Olds & Lowe, PLLC (57) ABSTRACT

A system is disclosed that enables the estimation of the location of a wireless terminal in a wireless network. The illustrative embodiment works without requiring modifications to be made to the wireless terminal. Furthermore, the hardware of some embodiments of the present invention can be inexpensively deployed indoors. Some embodiments of the present invention are, therefore, ideally suited for use with legacy indoor systems. The system of the illustrative embodiment of the present invention, in some embodiments, uses an offline process and an online process for location estimation. The described system, however, can be used with other techniques for location estimation.

30 Claims, 8 Drawing Sheets

OTHER PUBLICATIONS

Thomas W. Christ et al., "A Prison Guard Duress Alarm Location System," Proc. IEEE International Carnahan Conference on Security Technology, Oct. 1993.

Andrew M. Ladd et al., "Robotics-Based Location Sensing using Wireless Ethernet," The Eigthth ACM International Conference on Mobile Computing and Networking (Mobicom), Atlanta, GA, Sep. 2002.

P. Prasithsangaree et al., "On Indoor Position Location with Wireless LANs," The 13th IEEE Int'l Symposium on Personal, Indoor, and Mobile Radio Commun., Lisbon, Portugal, Sep. 2002.

Siddartha Saha et al., "Location Determination of a Mobile Device Using IEEE 802.11b Access Point Signals," IEEE Wireless Comm. and Networking Conf. 2003, New Orleans, Louisana, Mar. 2003.

Asim Smailagic et al., "Location Sensing and Privacy in a Context Aware Computing Environment," Pervasive Computing, 2001.

Moustafa Youssef et al., "WLAN Location Determination via Clustering and Probability Distributions," IEEE Int'l Conf. on Pervasive Computing and Comm. 2003, Fort Worth, TX, Mar. 2003.

* cited by examiner

ESTIMATING THE LOCATION OF INEXPENSIVE WIRELESS TERMINALS BY USING SIGNAL STRENGTH MEASUREMENTS

FIELD OF THE INVENTION

The present invention relates to telecommunications in general, and, more particularly, to estimating the location of a wireless terminal.

BACKGROUND OF THE INVENTION

Figure 1:
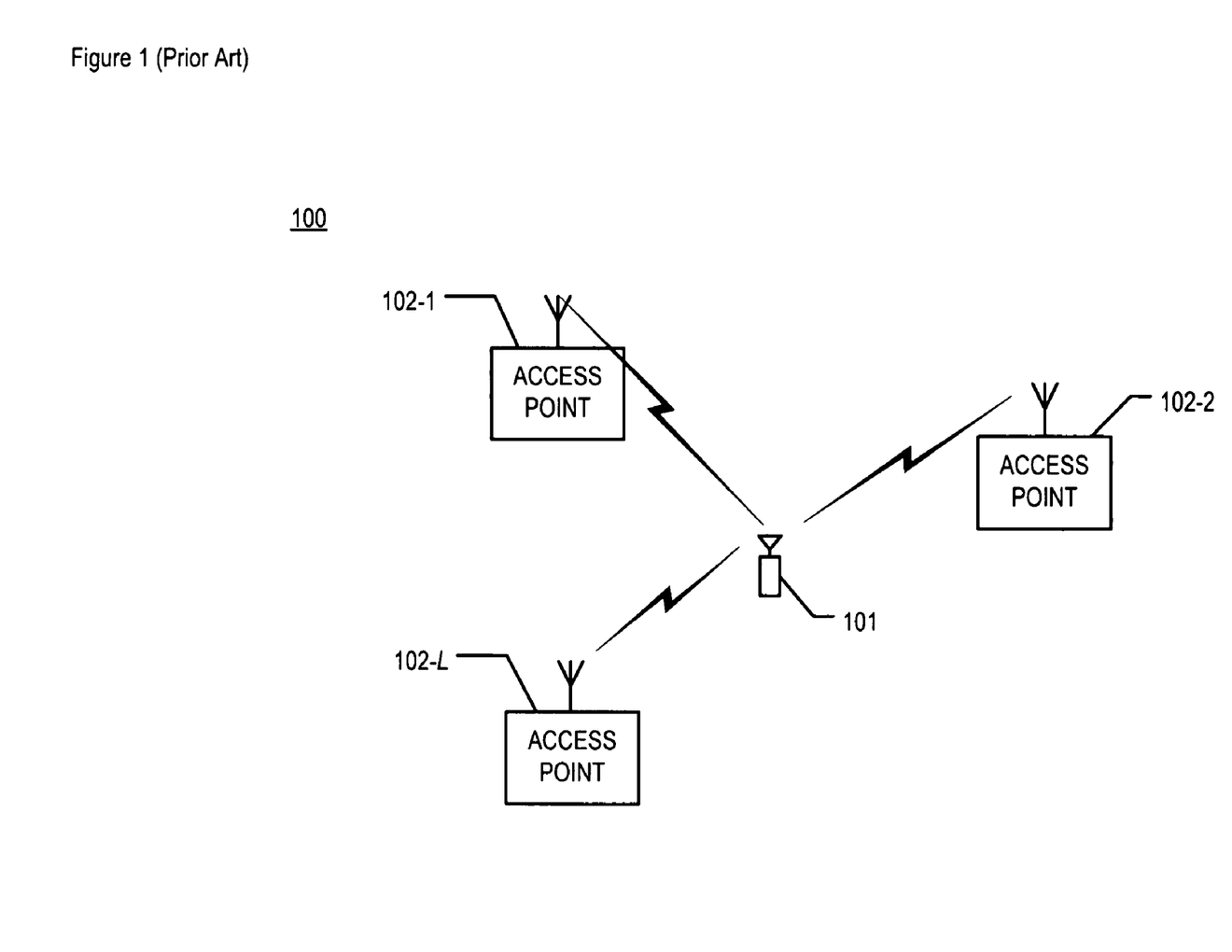
FIG. 1 depicts a schematic diagram of wireless network 100 in the prior art.

FIG. 1 depicts a schematic diagram of wireless network 100 in the prior art, which comprises wireless telecommunication terminal 101 and access points 102-1 through 102-L, interconnected as shown. Wireless terminal 101 uses access points 102-1 through 102-L to exchange blocks of data, or "packets," with computer servers that are external to wireless network 100. At any given time, wireless terminal 101 is associated with one of access points 102-1 through 102-L for the purpose of communicating with the external servers.

It is important in some operating scenarios to know the location of wireless terminal 101 within wireless network 100. Knowledge of the location of wireless terminal 101 enables services that use end-user location information. Such services include location-aware content delivery, emergency location, services based on the notion of "closest resource," and location-based access control.

Various techniques for estimating location exist in the prior art.

In accordance with one technique, the location of a wireless terminal is estimated to be at the center of the coverage area served by the access point with which the wireless terminal is associated. This technique is advantageous in that it does not require that additional hardware be added to the wireless terminal or to the wireless network, and this means that the first technique can be inexpensively implemented in legacy systems. The accuracy of the first technique, however, is a function of the size of the coverage area, and, therefore, it is generally not acceptable for applications that require higher accuracy.

In accordance with a second technique, the location of a wireless terminal is estimated by a radio navigation unit, such as a Global Positioning System receiver, that is incorporated into the wireless terminal. This technique is accurate to within a few meters and is advantageous in that it does not require that additional hardware be added to the telecommunication system's infrastructure. The second technique is disadvantageous, however, in that it cannot be used with legacy wireless terminals that do not comprise a radio navigation unit and, furthermore, cannot be used reliably indoors.

In accordance with a third technique, the location of a wireless terminal is estimated by triangulating the angle of arrival or the time of arrival of the signals transmitted by the wireless terminal to be located. Various receivers that are either part of or separate from the access points are part of the triangulation process. This technique is accurate to within a few meters and is advantageous in that it can be used with legacy wireless terminals. It is disadvantageous, however, in that it generally requires that specialized hardware be added to the wireless network, and this is very expensive.

In accordance with a fourth technique, the location of a wireless terminal is estimated by using wireless terminals to make signal measurements and to transmit those measurements to another device for analysis. This technique is accurate to within a few meters and is advantageous in that it exploits a potentially large installed base of wireless terminals. It is disadvantageous, however, in that it cannot be used with some legacy terminals. Such legacy terminals include those that do not have the ability to transmit signal strength measurements and those that do not have the ability to maintain a signal strength measurement database against which to match received signals.

Therefore, the need exists for a technique for estimating the location of a wireless terminal with higher resolution than the first technique and that can be inexpensively implemented in legacy systems.

SUMMARY OF THE INVENTION

The present invention enables the estimation of the location of a wireless terminal in a wireless network without some of the costs and disadvantages associated with techniques in the prior art. For example, some embodiments of the present invention operate without any modifications to the wireless terminal. Furthermore, some embodiments of the present invention can be deployed indoors. And still furthermore, some embodiments of the present invention are inexpensive and well-suited for use with wireless terminals and base stations that are not capable of measuring the strength of the signals emitted by the wireless terminals.

In some embodiments of the present invention, a plurality of transmit-only devices, hereinafter called "emitters," transmit one or more signals for the purpose of providing reference signals to measure. The emitters can be small, battery-operated, easy-to-situate devices that occasionally transmit a signal (representing a packet of data, for example). Each emitter is deployed at a known location.

A plurality of receivers, hereinafter called "signal monitors," measure the signal strength of the signals transmitted by each of the emitters, and each signal monitor is able to differentiate which emitters transmitted which signals. Each signal monitor is deployed at a known location.

Because the emitters and the signal monitors are deployed at known locations, and because the signal monitors can distinguish which signals are transmitted by which emitters, the collection of signal strength measurements can be used to build a database that correlates signal-strength measurements to location.

When the location of a wireless terminal is desired, the signal monitors can measure the signal strength of the signals from that wireless terminal, and using the database, estimate the location of the wireless terminal based on the signal-strength measurements.

Some embodiments of the present invention use both an offline process and an online process for location estimation. It will be clear, however, to those skilled in the art, after reading this specification, how to make and use the system with another process for location estimation.

For example, some embodiments use an offline model-building procedure and then an online estimation procedure. In the offline procedure, the signal monitors provide the signal strength measurements to a location estimation server. For each signal monitor's set of signal strength measurements, the location estimation server performs a two-dimensional interpolation on the measurements acquired from the signal monitor to generate signal strength samples throughout a grid of points that corresponds to the wireless network. The interpolation, in some embodiments, is performed using Akima splines. The location estimation server then combines the samples to get signal strength vectors for each grid point, which results in a synthetic model.

In the online estimation part, the location estimation server matches a presented signal strength vector against the synthetic model to determine the closest match. The closest matching grid point is identified as the location of the wireless terminal.

An illustrative embodiment of the present invention comprises: a first signal monitor for measuring: (i) the signal strength at the first signal monitor of a first packet transmitted by an emitter; and (ii) the signal strength at the first signal monitor of a second packet transmitted by a wireless terminal; and a processor for: (a) receiving the location of the emitter; and (b) determining the location of the wireless terminal based on (i), (ii), and the location of the emitter.

DETAILED DESCRIPTION

Figure 2:
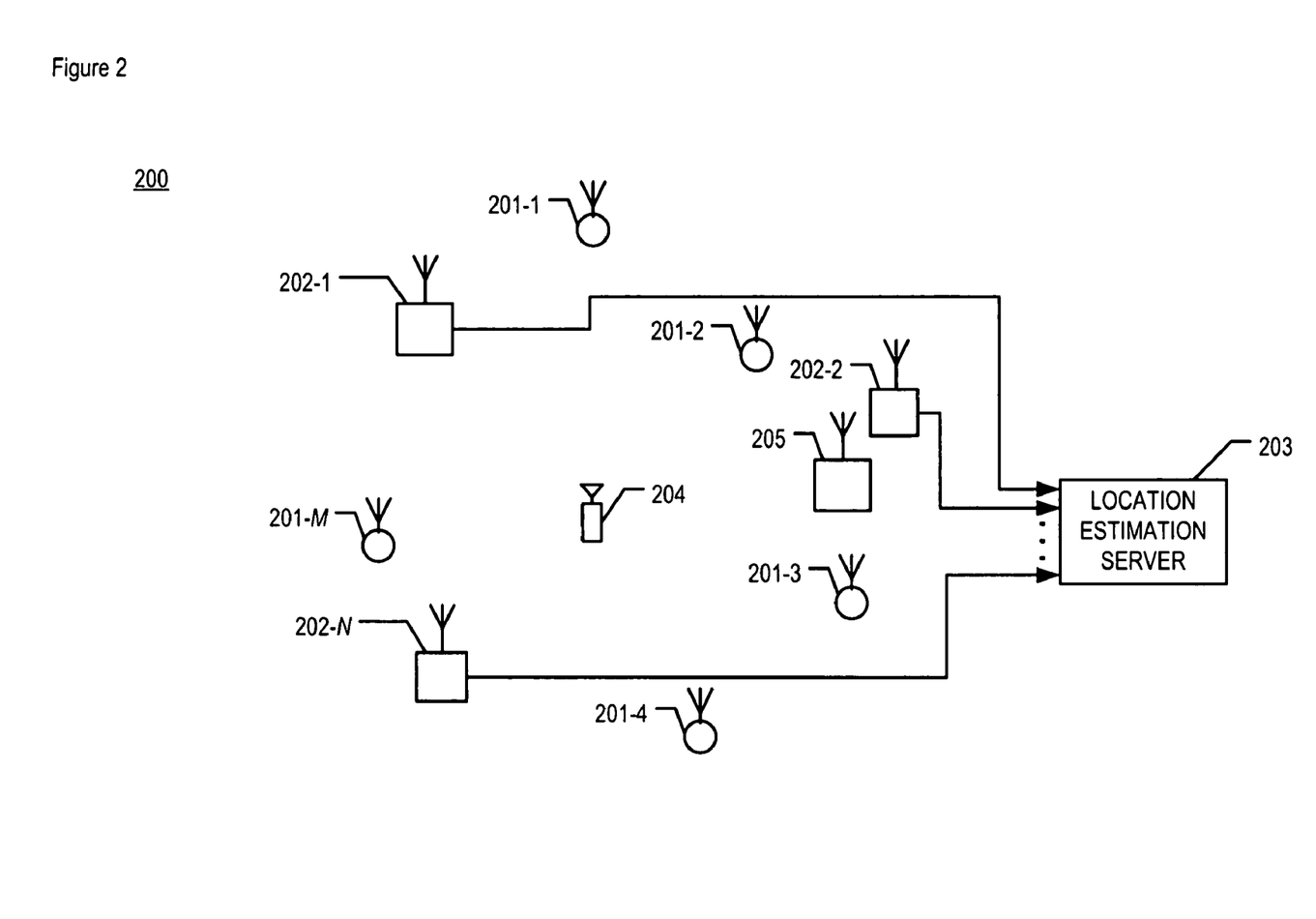
FIG. 2 depicts a schematic diagram of network 200 in accordance with the illustrative embodiment of the present invention.

FIG. 2 depicts a schematic diagram of network 200 that comprises the components of the illustrative embodiment of the present invention. Network 200 operates in accordance with a set of air interface protocols (e.g., IEEE 802.11, etc.) and comprises signal emitters 201-1 through 201-M, wherein M is a positive integer; signal monitors 202-1 through 202-N, wherein N is a positive integer; location estimation server 203; wireless terminal 204; and access point 205, interconnected as shown.

Signal emitter 201-$i$, for $i=1$ to M, is capable of transmitting a signal over a wireless medium in well-known fashion. The signal can represent packets of data that comprise information used for identifying emitter 201-$i$. Emitter 201-$i$ is stationary in some embodiments. In some embodiments, the identifying information indicates the location of emitter 201-$i$. In other embodiments, the identifying information is the medium access control address of emitter 201-$i$. The salient details of emitter 201-$i$ are described below and with respect to FIG. 3.

Signal monitor 202-$j$, for $j=1$ to N, measures (i.e., "sniffs") signals that are present on the wireless medium and transmitted by various signal sources, and determines the received signal strength (RSS) of those signals. Signal sources include emitter 201-$i$ and wireless terminal 204. Signal monitor 202-$j$ sends the signal strength measurements to location estimation server 203. In addition, in some embodiments signal monitor 202-$j$ receives the identifying information transmitted by emitter 201-$i$ or wireless terminal 204 or both and sends the information to location estimation server 203. In some embodiments, signal monitor 202-$j$ provides information (e.g., its coordinates, its identifier, etc.) with which to determine its location—either directly or indirectly—to location estimation server 203. The salient details of signal monitor 202-$j$ are described below and with respect to FIG. 4.

FIG. 2 depicts a wired interface between signal monitors 202-1 through 202-N and location estimation server 203. Signal monitors 202-1 through 202-N, however, can communicate with location estimation server 203 via a wired interface, the wireless medium, or both in well-known fashion.

Location estimation server 203 acquires the received signal strength measurements from signal monitors 202-1 through 202-N. Location estimation server processes the received signal strength measurements corresponding to one or more of emitters 201-1 through 201-M in accordance with the illustrative embodiment of the present invention. The salient details of location estimation server 203 are described below and with respect to FIG. 5.

Wireless terminal 204 is capable of transmitting packets of data over a wireless medium in well-known fashion. The packets of data can comprise information that identifies wireless terminal 204. Wireless terminal 204 comprises a transmitter for the purpose of transmitting the packets of data. Wireless terminal 204 can be a communications station, a locating device, a handheld computer, a laptop with wireless capability, a telephone, etc. It will be clear to those skilled in the art how to make and use wireless terminal 204.

Wireless terminal 204, in some embodiments, exchanges packets with access point 205. Signal monitor 202-$j$ can measure these packets for the purpose of estimating location. In other embodiments, wireless terminal 204 transmits packets specifically for the purpose of estimating the location of wireless terminal 204.

Access point 205, in some embodiments, exchanges packets of data with wireless terminal 204 in well-known fashion. Access point 205 can be used to coordinate communication in network 200 and to provide wireless terminal 204 with access to networks that are external to network 200, in well-known fashion. In other embodiments, access point 205 is not present. It will be clear to those skilled in the art how to make and use access point 205.

Guidelines on where to place emitter 201-$i$ within the area served by wireless network 200 are described here. The area served by wireless network 200 is divided into sub-regions of approximately equal size such that at least seven sub-regions are within transmitting range of each of signal monitors 202-1 through 202-N. The seven sub-regions allow for reasonable smoothing, a technique that is described later. Each emitter 201-$i$ is then placed as closely as possible to the center of the corresponding sub-region. If smoothing is done using a generalized additive model, as is known in the art, it is beneficial to place emitters 201-1 through 201-M to present a large number of distinct x and y coordinates of a grid that represents the area served, while keeping emitters 201-1 through 201-M as far apart as possible. The grid mentioned here is described later. It will be clear to those skilled in the art, after reading this specification, that other techniques can be used to place emitters 201-1 through 201-M.

Guidelines on where to place signal monitor 202-$j$ are described here. In some embodiments, signal monitor 202-$j$ and access point 205 are collocated. In other embodiments, additional signal monitors, or signal monitors not collocated with access point 205 are placed to ensure that signal monitors 202-1 through 202-N are not collinear (or no three signal monitors are collinear) within the x-y coordinate plane mentioned earlier.

Figure 3:
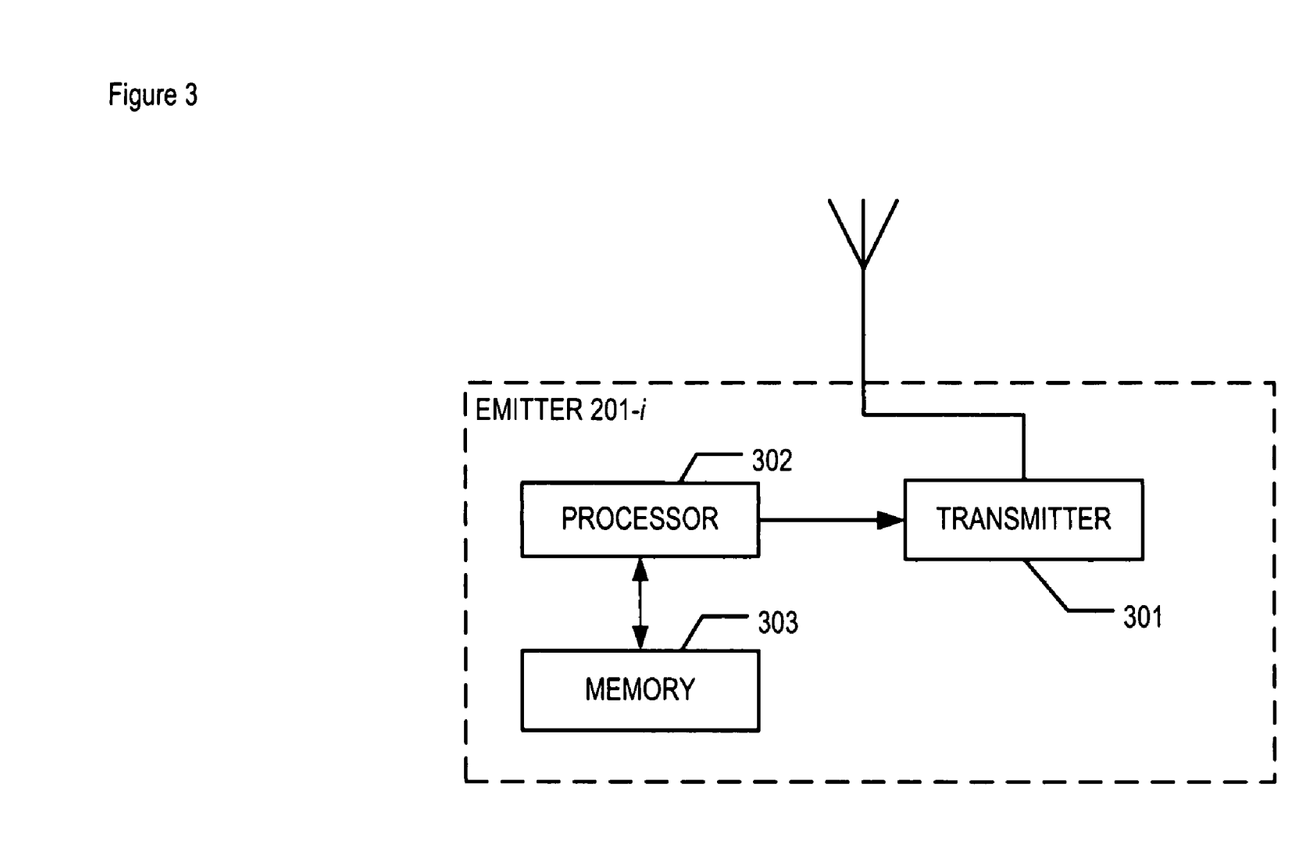
FIG. 3 depicts a block diagram of the salient components of emitter 201-$i$ in accordance with the illustrative embodiment of the present invention.

FIG. 3 depicts a block diagram of the salient components of emitter 201-$i$ in accordance with the illustrative embodiment of the present invention. Emitter 201-$i$ comprises transmitter 301, processor 302, and memory 303, interconnected as shown. Emitter 201-$i$ can be battery-operated or powered via an external source.

Transmitter 301 is a circuit that is capable of transmitting packets into the wireless medium, in well-known fashion, from processor 302. It will be clear to those skilled in the art how to make and use transmitter 301.

Processor 302 is a general-purpose processor that is capable of performing the tasks described below and with respect to FIGS. 6 and 7. It will be clear to those skilled in the art, after reading this specification, how to make and use processor 302.

Memory 303 is capable of storing programs and data used by processor 302. It will be clear to those skilled in the art how to make and use memory 303.

Figure 4:
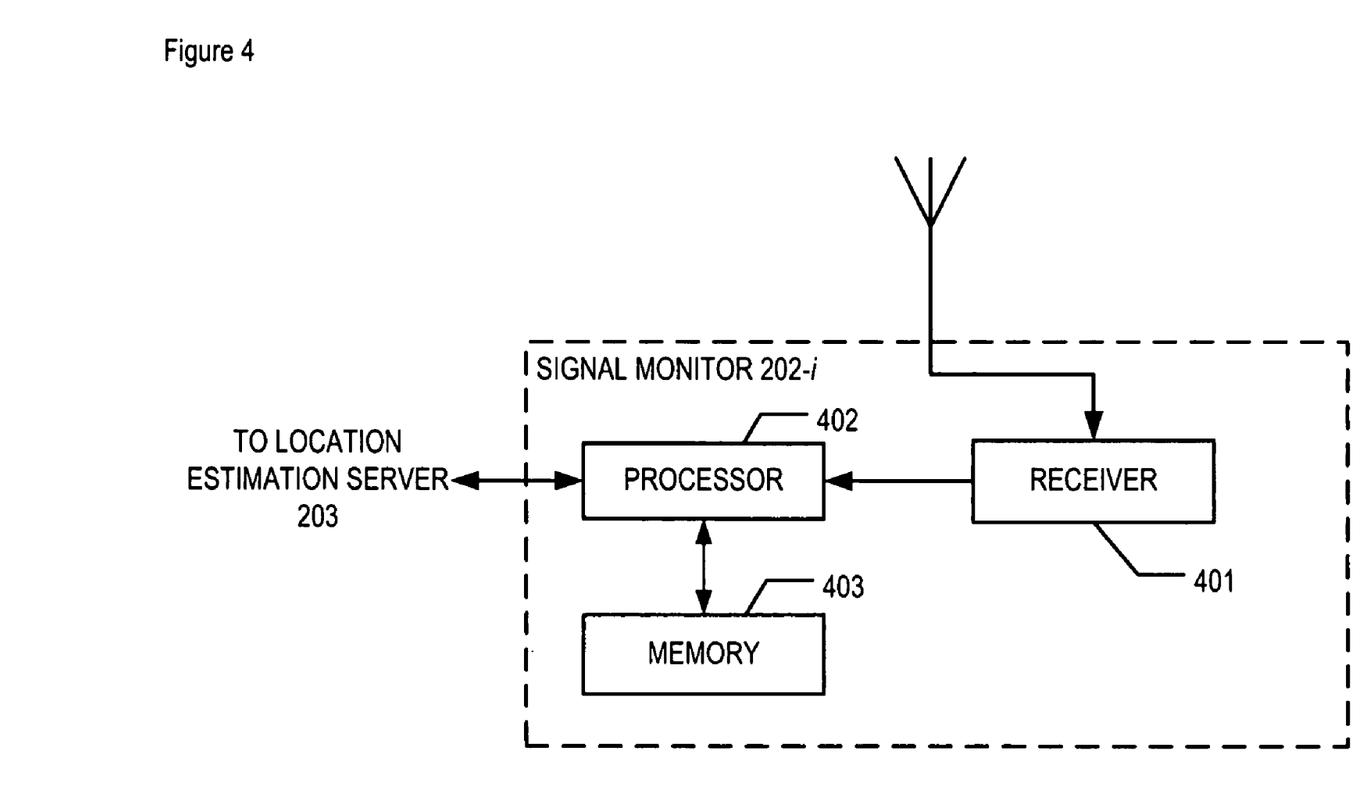
FIG. 4 depicts a block diagram of the salient components of signal monitor 202-$j$ in accordance with the illustrative embodiment of the present invention.

FIG. 4 depicts a block diagram of the salient components of signal monitor 202-$j$ in accordance with the illustrative embodiment of the present invention. Signal monitor 202-$j$ comprises receiver 401, processor 402, and memory 403, interconnected as shown.

Receiver 401 is a circuit that is capable of receiving packets from the wireless medium, in well-known fashion, and of forwarding them to processor 402. It will be clear to those skilled in the art how to make and use receiver 401.

Processor 402 is a general-purpose processor that is capable of performing the tasks described below and with respect to FIGS. 6 through 8. It will be clear to those skilled in the art, after reading this specification, how to make and use processor 402.

Memory 403 is capable of storing programs and data used by processor 402. It will be clear to those skilled in the art how to make and use memory 403.

Figure 5:
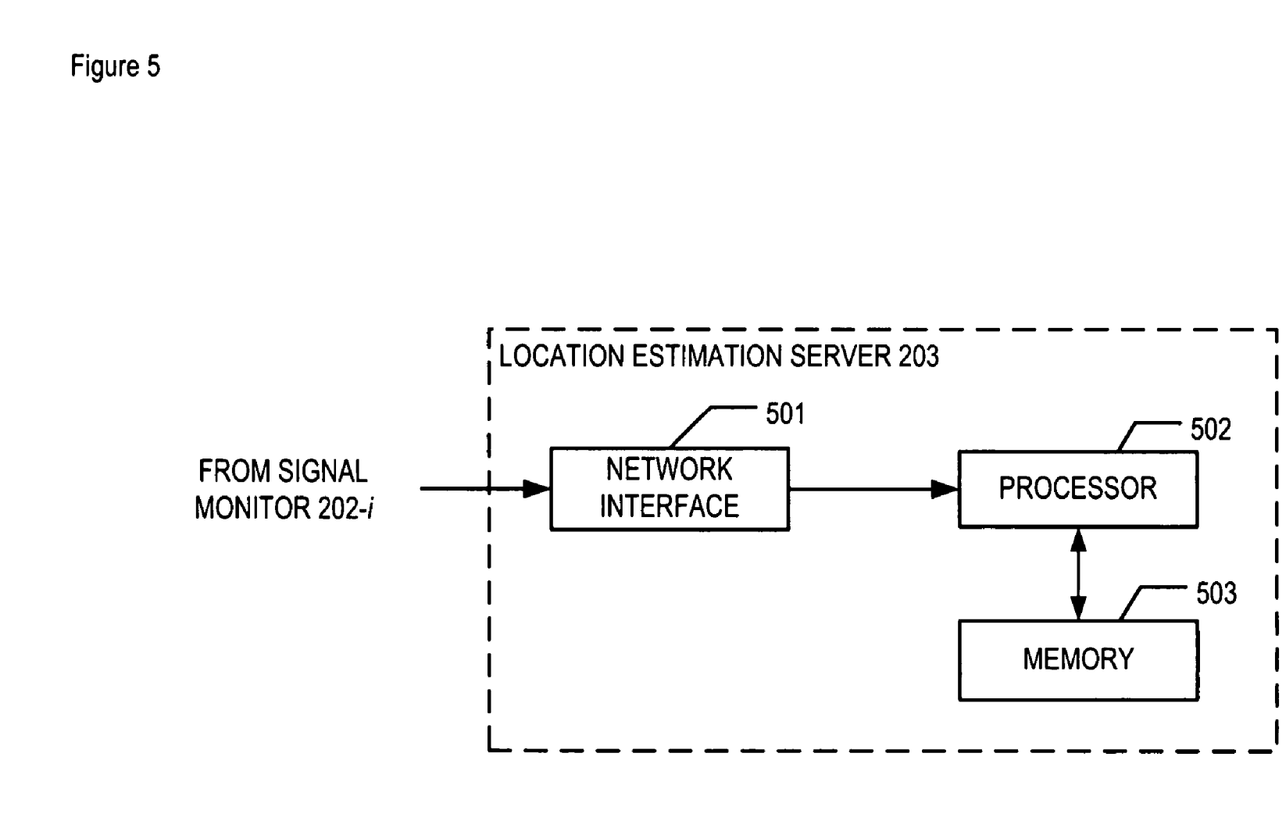
FIG. 5 depicts a block diagram of the salient components of location estimation server 203 in accordance with the illustrative embodiment of the present invention.

FIG. 5 depicts a block diagram of the salient components of location estimation server 203 in accordance with the illustrative embodiment of the present invention. Location estimation server 203 comprises network interface 501, processor 502, and memory 503, interconnected as shown.

Network interface 501 is a circuit that is capable of receiving, in well-known fashion, received signal strength measurements and emitter identifier information from one or more of signal monitors 202-1 through 202-N. In some embodiments, network interface 501 receives signal monitor identifier information from one or more of signal monitors 202-1 through 202-N. Network interface 501 is also capable of forwarding the signal strength measurements and identifier information received to processor 502. It will be clear to those skilled in the art how to make and use network interface 501.

Processor 502 is a general-purpose processor that is capable of performing the tasks described below and with respect to FIGS. 6 through 8. It will be clear to those skilled in the art, after reading this specification, how to make and use processor 502.

Memory 503 is capable of storing programs and data used by processor 502. It will be clear to those skilled in the art how to make and use memory 503.

Figure 6:
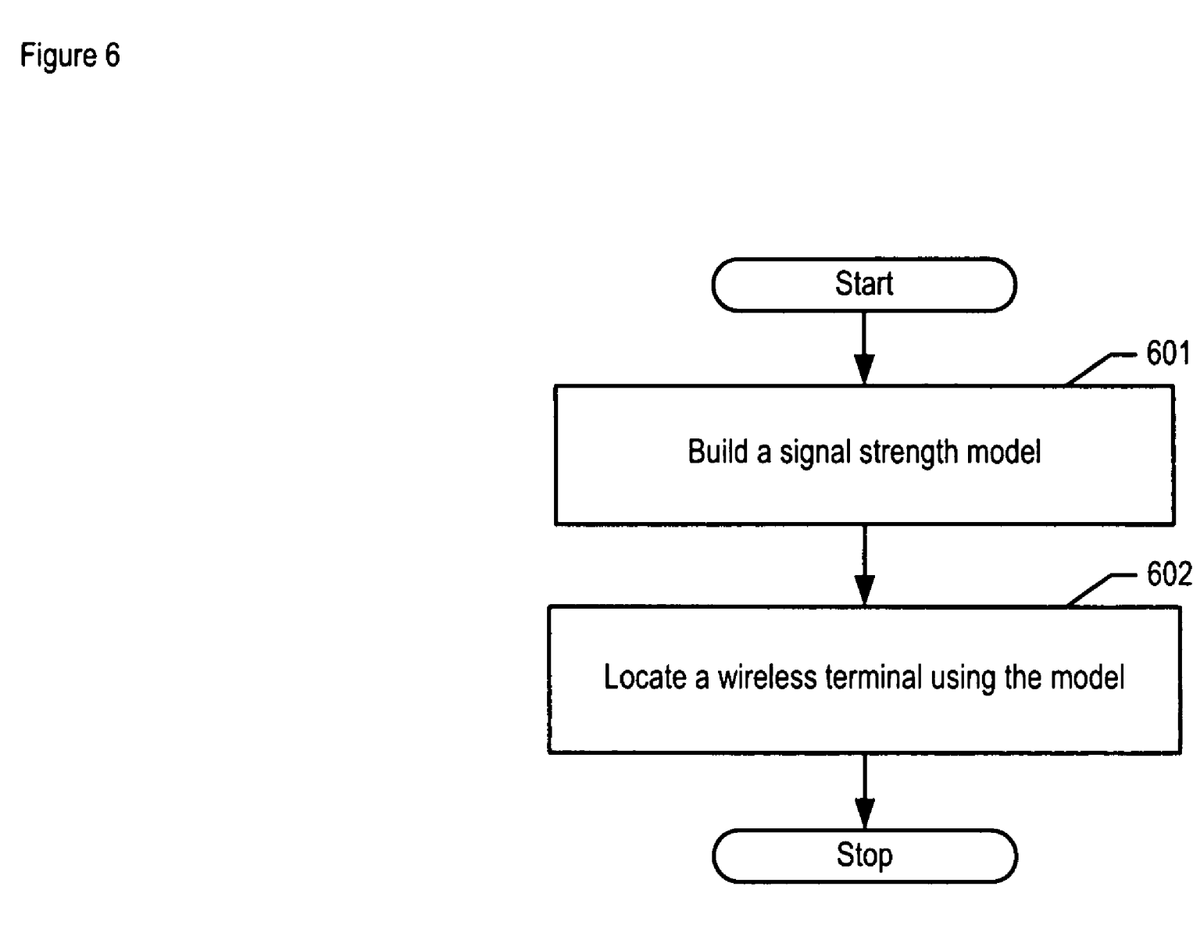
FIG. 6 depicts a flowchart that summarizes the tasks performed by the illustrative embodiment of the present invention.

FIG. 6 depicts an overview of a location estimation technique that can be performed by the system of the illustrative embodiment. The technique uses an offline process to build a signal strength model, followed by an online process to compare a presented signal strength vector against the signal strength model built. It will be clear, however, to those skilled in the art how to apply a different technique to the system described with respect to FIGS. 2 through 5.

At task 601 as part of the offline process, location estimation server 203 acquires from one or more of signal monitors 202-1 through 202-N the received signal strength measurements from one or more of emitters 201-1 through 201-M. Location estimation server 203 also acquires the identifiers (e.g., medium access control addresses, location coordinates, etc.) of one or more of emitters 201-1 through 201-M and maps the identifiers to emitter location. Location estimation server 203 uses the acquired information to build—and refine, if needed—its signal strength model for location estimation.

At task 602 as part of the online process, when wireless terminal 204 needs to be located or tracked, location estimation server 203 uses the signal strength measurements corresponding to wireless terminal 204, as made by signal monitors 202-1 through 202-N, in conjunction with the signal strength model built.

Figure 7:
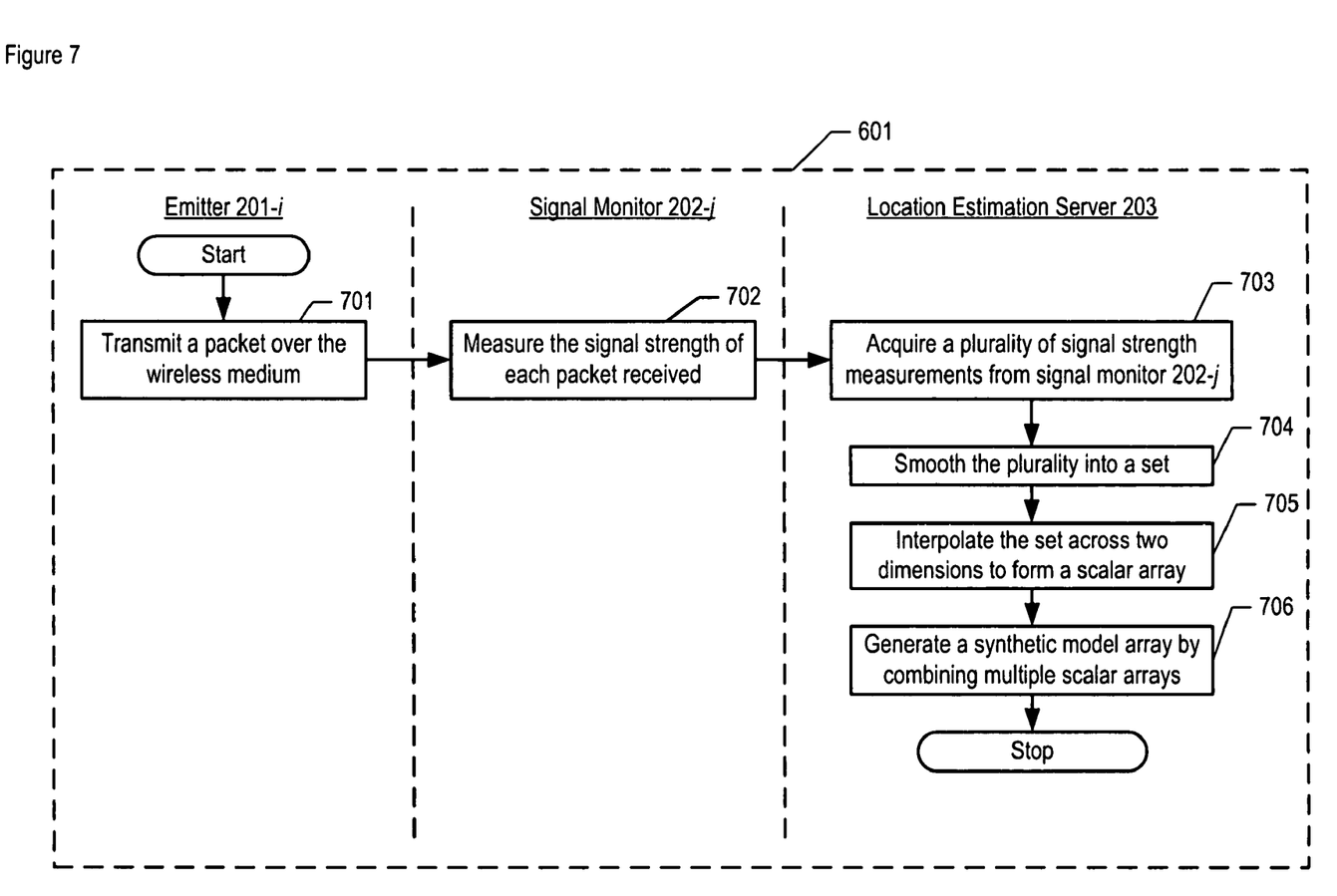
FIG. 7 depicts a flowchart of task 601 performed in accordance with the illustrative embodiment of the present invention.

FIG. 7 depicts a flowchart of the salient tasks that constitute task 601, performed in accordance with the illustrative embodiment of the present invention. It will be clear to those skilled in the art which tasks depicted in FIG. 7 can be performed simultaneously or in a different order than that depicted.

At task 701, each of emitters 201-1 through 201-M transmits one or more packets over the wireless medium. Emitter 201-$i$ transmits the packets periodically or sporadically. In some embodiments, emitter 201-$i$ is prompted by another device (e.g., signal monitor 202-$j$, etc.) to transmit a packet. Typically, emitter 201-$i$ only has to transmit the packets occasionally (e.g., a couple of times each hour, etc.), depending on how fast the signal strength model needs to be verified and updated. In some embodiments, emitter 201-$i$ transmits an identifier.

At task 702, each of signal monitors 202-1 through 202-N measures the signal strength of each packet.

At task 703, location estimation server 203 acquires a plurality of signal strength measurements from each of signal monitors 202-1 through 202-N. The location of each emitter 201-$i$ is also made available to or determined by location estimation server 203. For instance, location estimation server 203 can receive the coordinates of emitter 201-$i$. Alternatively, location estimation server 203 can receive the medium access control address of emitter 201-$i$ and derive emitter 201-$i$'s location from a lookup table.

In some embodiments, when signal strength measurements are missing for one or more signal emitters, location estimation server 203 assigns signal strength measurement values that are pegged low (e.g., −92 dBm, etc.) to represent those emitters for which signal strength measurements have not been received. Pegging the emitter's missing reading to a low value, in essence, indicates that the point in question is far away from the signal monitor 202-$j$.

At this point, location estimation server 203 receives a signal strength measurement (i.e., actual or pegged values) that is representative of each of emitters 201-1 through 201-M from each of signal monitors 202-1 through 202-N. Furthermore, location estimation server 203 has available the emitter location from which each signal strength measurement was transmitted.

In some embodiments, the signal strength measurement that represents a particular signal source is actually either (i) the median of or (ii) the mean of more than one signal strength measurement made over time on multiple packets transmitted by that signal source. It will be clear to those skilled in the art how to determine either the median or the mean of more than one signal strength measurement.

At task 704, in some embodiments, location estimation server 203 smoothes, in well-known fashion, each signal monitor's plurality of signal strength measurements received from one or more of signal monitors 202-1 through 202-N. An example of a smoothing algorithm uses a generalized additive model (GAM), as is known in the art. It will be clear to those skilled in the art when to apply smoothing and when not to apply smoothing. For example, when there are few signal emitters (i.e., the value M is small) that are far apart, smoothing becomes less important.

Location estimation server 203 then generates a synthetic model by first dividing the wireless network area being modeled into grid squares of known size (e.g., three feet by three feet, etc.). At task 705 location estimation server 203 interpolates over two dimensions, for each signal monitor independently, each plurality of signal strength measurements, already smoothed in some embodiments, to estimate the received signal strength at the center of each grid square. In some embodiments, location estimation server 203 uses Akima splines for the interpolation. Akima spline interpolation is a local, triangle-based technique, as is known in the art. The resultant synthetic model for each signal monitor 202-*j* is a scalar array of signal strengths with an estimated signal strength that corresponds to each grid square. Location estimate server 203 uses the known locations of emitters 201-1 through 201-M and the received signal strengths that correspond to signals transmitted from those known locations to compute the model in well-known fashion.

At task 706, after processing data from signal monitors 202-1 through 202-N, location estimation server 203 generates a vector array by combining the scalar arrays formed at task 705. If scalar arrays for all of signal monitors 202-1 through 202-N are available, each vector array cell, which corresponds to grid square, has an associated N-vector of signal strengths.

Location estimation server 203 repeats tasks 701 through 706 whenever the model needs to be rebuilt. For instance, location estimation server 203 can rebuild the model when at least one of signal monitors 202-1 through 202-N measures a signal strength from any of emitters 201-1 through 201-M that consistently exhibits a statistically significant deviation in the ongoing course of transmitting signals. It will be clear to those skilled in the art when to rebuild the model.

Figure 8:
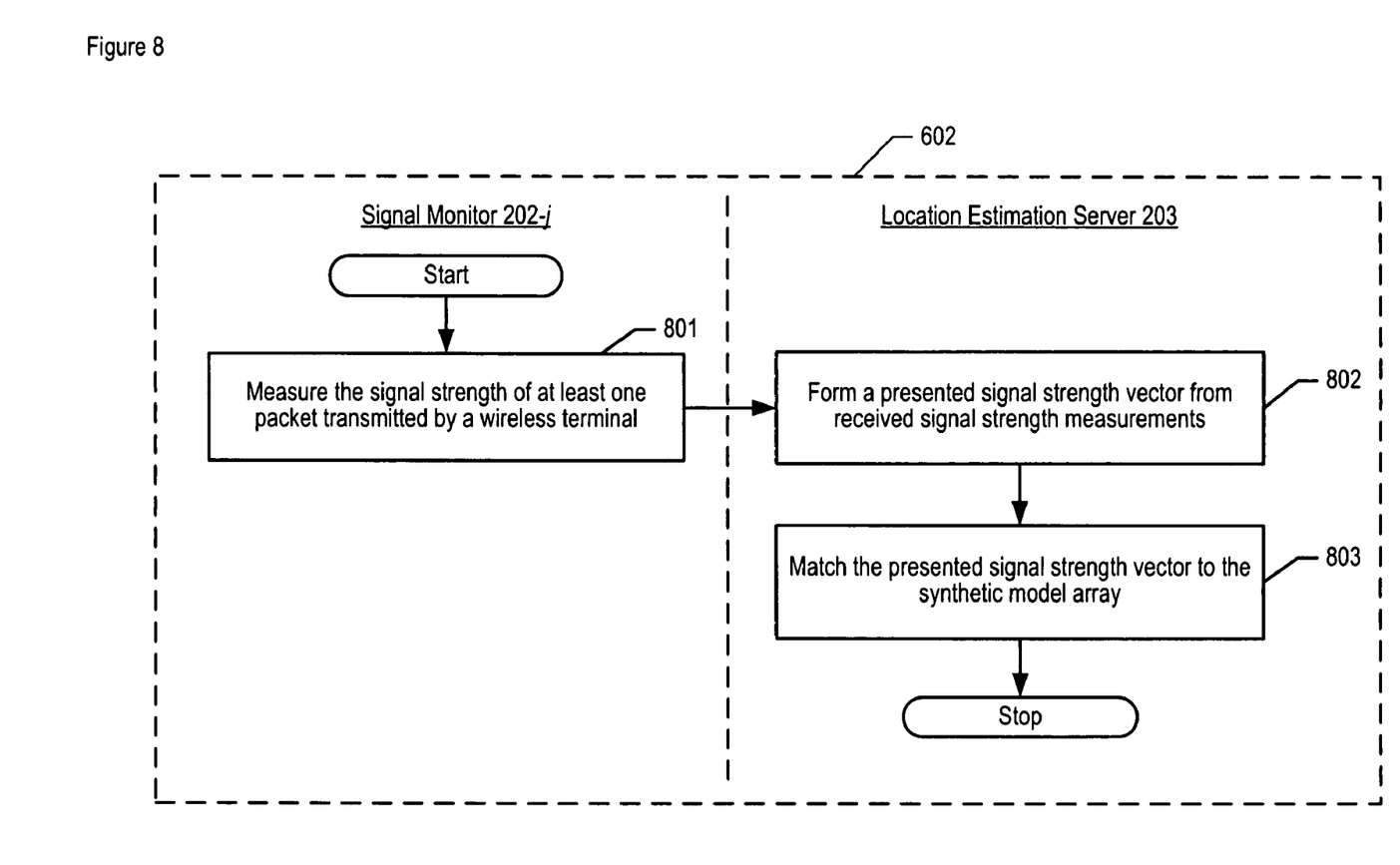
FIG. 8 depicts a flowchart of task 602 performed in accordance with the illustrative embodiment of the present invention.

FIG. 8 depicts the salient tasks that constitute task 602, performed in accordance with the illustrative embodiment of the present invention.

At task 801, signal monitor 202-*j* measures the signal strength of at least one packet transmitted by wireless terminal 204. Note that the location of the wireless terminal is unknown before measuring the signal strength of the packet. Furthermore, no previous information on the wireless terminal is available necessarily to the system of the illustrative embodiment. The signal strength measurement of the packet transmitted by wireless terminal 204, along with the signal strength measurement of the packet and the identifier transmitted by each emitter 201-*i*, is used to determine the location of wireless terminal 204.

In some embodiments, the signal strength measurement that represents wireless terminal 204 is actually either (i) the median of or (ii) the mean of more than one signal strength measurement made over time on multiple packets transmitted by wireless terminal 204. It will be clear to those skilled in the art how to determine either the median or the mean of more than one signal strength measurement.

In some embodiments, wireless terminal 204 is prompted by another device (e.g., access point 205, etc.) to transmit a packet.

At task 802, location estimation server 203 receives one or more signal strength measurements of wireless terminal 204 from at least one of signal monitors 202-1 through 202-N. Location estimation server 203 combines the measurements to form a presented signal strength vector in well-known fashion.

Location estimation server 203, in some embodiments, assigns a value pegged to a low number (e.g., −92 dBm, etc.) in place of signals not received from one or more signal monitors, in order to infer location.

At task 803, location estimation server 203 matches the presented signal strength vector as detected by signal monitors 202-1 through 202-N with the synthetic model to locate the wireless terminal. In some embodiments, location estimation server 203 uses a nearest neighbor search (NNS), as is known in the art. It will be clear to those skilled in the art how to match a presented vector with an array of synthetic model vectors.

It is to be understood that the above-described embodiments are merely illustrative of the present invention and that many variations of the above-described embodiments can be devised by those skilled in the art without departing from the scope of the invention. For example, in this Specification, numerous specific details are provided in order provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising:
   a first signal monitor for measuring:
   (i) the signal strength at said first signal monitor of a first packet transmitted by an emitter; and
   (ii) the signal strength at said first signal monitor of a second packet transmitted by a wireless terminal; and
   a processor for:
   (a) receiving the location of said emitter; and
   (b) determining the location of said wireless terminal based on (i), (ii), and the location of said emitter.

2. The apparatus of claim 1 further comprising said emitter for transmitting over a wireless medium said first packet wherein said first packet comprises information related to the location of said emitter.

3. The apparatus of claim 2 wherein said emitter is stationary.

4. The apparatus of claim 2 wherein said information related to the location of said emitter indicates the medium access control address of said emitter.

5. The apparatus of claim 2 wherein said information related to the location of said emitter indicates the coordinates of said emitter.

6. The apparatus of claim 1 further comprising a second signal monitor for measuring:
   (i) the signal strength at said second signal monitor of said first packet transmitted by said emitter; and
   (ii) the signal strength at said second signal monitor of said second packet transmitted by said wireless terminal.

7. An apparatus comprising:
   a first signal monitor for measuring:
      (i) the signal strength at said first signal monitor of a first packet transmitted by an emitter;
      (ii) the signal strength at said first signal monitor of a second packet transmitted by a wireless terminal;
   a second signal monitor for measuring:
      (i) the signal strength at said second signal monitor of said first packet transmitted by said emitter; and
      (ii) the signal strength at said second signal monitor of said second packet transmitted by said wireless terminal; and
   a processor for:
      (a) receiving the location of said emitter; and
      (b) determining the location of said wireless terminal based on (i) the signal strength at said first signal monitor of the first packet transmitted by the emitter, (ii) the signal strength at said first signal monitor of the second packet transmitted by the wireless terminal, and the location of said emitter, wherein said processor is also for:
      acquiring (i) a first plurality of signal strength measurements made by said first signal monitor and (ii) a second plurality of signal strength measurements made by said second signal monitor, wherein said first plurality and said second plurality each are associated with a plurality of signal sources that comprise said emitter;
      interpolating (i) said first plurality across two dimensions to form a first scalar array of signal samples and (ii) said second plurality across two dimensions to form a second scalar array of signal samples; and
      generating a vector array of synthetic signal strength vectors based on said first scalar array of signal samples and said second scalar array of signal samples.

8. The apparatus of claim 7 wherein said processor is also for matching a presented signal strength vector to at least one of said synthetic signal strength vectors.

9. The apparatus of claim 8 wherein matching said presented signal strength vector comprises finding the closest match in signal vector space.

10. The apparatus of claim 7 wherein interpolating said first plurality is performed using Akima splines.

11. The apparatus of claim 7 wherein said processor is also for smoothing said first plurality.

12. The apparatus of claim 11 wherein smoothing is based on a generalized additive model.

13. The apparatus of claim 7 wherein said processor is also for assigning a signal value in place of a missing signal strength measurement.

14. The apparatus of claim 13 wherein said signal value is less than or equal to −92 dBm.

15. The apparatus of claim 7 wherein the signal strength measurement that represents a signal source is one of (i) the median of and (ii) the mean of more than one signal strength measurement made over time of said signal source.

16. An apparatus comprising:
   an emitter for transmitting a signal and an identifier;
   a first signal monitor for making:
      (i) a first plurality of signal strength measurements of said signal, wherein said first plurality is associated with a plurality of signal sources that comprise said emitter; and
      (ii) a measurement of at least one packet from a wireless terminal; and
   a second signal monitor for making a second plurality of signal measurements, wherein said second plurality is associated with a plurality of signal sources that comprise said emitter; wherein said first plurality of signal strength measurements, said second plurality of signal strength measurements, said identifier, and said measurement of said at least one packet are used to determine the location of said wireless terminal.

17. The apparatus of claim 16 wherein an access point is collocated with said first signal monitor.

18. The apparatus of claim 16 wherein said emitter is stationary.

19. The apparatus of claim 16 wherein said identifier indicates the medium access control address of said emitter.

20. The apparatus of claim 16 wherein said identifier indicates the location of said emitter.

21. An apparatus comprising:
   an emitter for transmitting a signal and an identifier;
   a first signal monitor for making:
      (i) a first plurality of signal strength measurements of said signal, wherein said first plurality is associated with a plurality of signal sources that comprise said emitter; and
      (ii) a measurement of at least one packet from a wireless terminal;
   a second signal monitor for making a second plurality of signal measurements, wherein said second plurality is associated with a plurality of signal sources that comprise said emitter; wherein said first plurality of signal strength measurements, said second plurality of signal strength measurements, said identifier, and said measurement of said at least one packet are used to determine the location of said wireless terminal; and
   a location estimation server for:
      smoothing (i) said first plurality to form a first set of smoothed measurements and (ii) said second plurality to form a second set of smoothed measurements;
      interpolating (i) said first set of smoothed measurements across two dimensions to form a first scalar array of signal samples and (ii) said second set of smoothed measurements across two dimensions to form a second scalar array of signal samples; and
      generating a vector array of synthetic signal strength vectors based on said first scalar array of signal samples and said second scalar array of signal samples.

22. The apparatus of claim 21 wherein said location estimation server is also for matching a presented signal strength vector to at least one of said synthetic signal strength vectors.

23. The apparatus of claim 21 wherein smoothing is based on a generalized additive model.

24. The apparatus of claim 21 wherein interpolating said first plurality is performed using Akima splines.

25. The apparatus of claim 21 wherein said location estimation server is also for assigning a signal value in place of a missing signal strength measurement.

26. The apparatus of claim 21 wherein said signal value is less than or equal to −92 dBm.

27. An apparatus comprising:
an emitter for transmitting a signal and an identifier;
a first signal monitor for making:
- (i) a first plurality of signal strength measurements of said signal, wherein said first plurality is associated with a plurality of signal sources that comprise said emitter; and
- (ii) a measurement of at least one packet from a wireless terminal;

a second signal monitor for making a second plurality of signal measurements, wherein said second plurality is associated with a plurality of signal sources that comprise said emitter; wherein said first plurality of signal strength measurements, said second plurality of signal strength measurements, said identifier, and said measurement of said at least one packet are used to determine the location of said wireless terminal;

wherein the signal strength measurement that represents a signal source is one of (i) the median of and (ii) the mean of more than one signal strength measurement made over time of said signal source.

28. An apparatus comprising: a network interface for acquiring a first plurality of signal strength measurements that are received by a first signal monitor, wherein said first plurality represents a plurality of signal sources; and a processor for:

- (i) smoothing said first plurality to form a first set;
- (ii) interpolating said first set to form a first scalar array of signal samples across two dimensions; and
- (iii) generating a vector array of synthetic signal strength vectors based on said first scalar array of signal samples and a second scalar array of signal samples.

29. The apparatus of claim 28 further comprising:

a first emitter for transmitting a first signal and a first identifier; said first signal monitor for making:
- (i) said first plurality of signal strength measurements of said first signal, wherein said first plurality is associated with a plurality of signal sources that comprise said first emitter; and
- (ii) a measurement of at least one packet from a wireless terminal; and a second signal monitor for making a second plurality of signal strength measurements, wherein said second plurality is associated with a plurality of signal sources that comprise said first emitter; wherein said first plurality of signal strength measurements, said second plurality of signal strength measurements, said first identifier, and said measurement of said at least one packet are used to determine the location of said wireless-terminal.

30. The apparatus of claim 29 further comprising a second emitter for transmitting a second signal and a second identifier, wherein said second signal and said second identifier are used to determine the location of said wireless terminal.

* * * * *